US012759131B2

(12) United States Patent
Oller

(10) Patent No.: US 12,759,131 B2
(45) Date of Patent: Oct. 13, 2026

(54) ADJUSTABLE HOLE FRAMER DEVICE

(71) Applicant: Mark Oller, Island Park, ID (US)

(72) Inventor: Mark Oller, Island Park, ID (US)

( * ) Notice: Subject to any disclaimer, the term of this patent is extended or adjusted under 35 U.S.C. 154(b) by 296 days.

(21) Appl. No.: 18/624,189

(22) Filed: Apr. 2, 2024

(65) Prior Publication Data

US 2025/0205870 A1 Jun. 26, 2025

Related U.S. Application Data

(60) Provisional application No. 63/613,326, filed on Dec. 21, 2023.

(51) Int. Cl.
*B25H 1/00* (2006.01)
*B25H 1/10* (2006.01)

(52) U.S. Cl.
CPC .................................... *B25H 1/10* (2013.01)

(58) Field of Classification Search
CPC ................ B25H 1/10; G01B 1/20; B25B 1/20
See application file for complete search history.

(56) References Cited

U.S. PATENT DOCUMENTS 3,776,437 A * 12/1973 Carney .................. B63B 32/83 224/406
4,968,189 A 11/1990 Pidgeon
5,353,509 A * 10/1994 Black ...................... G01C 9/28 33/476
5,366,326 A 11/1994 Converse
6,367,788 B1 * 4/2002 Babchuk ............. B23K 37/053 269/45
6,676,343 B2 1/2004 Burk
6,881,017 B1 4/2005 Krecek
9,320,357 B1 * 4/2016 Tian ......................... B25H 1/10
11,614,315 B1 * 3/2023 Luo .......................... G01B 3/04 33/479
2003/0063956 A1 4/2003 Burk
2004/0216316 A1 * 11/2004 Ellis ....................... G01B 3/563 33/471
2013/0283626 A1 * 10/2013 Jones ...................... G01B 3/06 33/418
2014/0373372 A1 * 12/2014 Flippo ..................... B43L 7/10 33/418
2024/0157886 A1 * 5/2024 Gränsmark ............... B60R 9/06
2025/0205870 A1 * 6/2025 Oller ........................ B25H 1/10

* cited by examiner

*Primary Examiner* — Lee D Wilson
(74) *Attorney, Agent, or Firm* — Brennan, Manna & Diamond, LLC

(57) ABSTRACT

An adjustable hole frame device is provided. The device is comprised of a combination of vertical and horizontal frame members, each containing rollers capable of 360-degree rotation within tracks or slots of the members and can be fixed in position using fasteners such as set screws. Additionally, the frames include measurement lines for precise positioning and openings for securing the device to a surface with fasteners like screws, nails, or bolts. During use, the horizontal and vertical members can be secured and wherein the rollers of each member can be positioned to stabilize the bit/working end of a cutting tool such that the tool is supported while cutting, drilling, and/or enlarging a hole in a surface.

12 Claims, 3 Drawing Sheets

ADJUSTABLE HOLE FRAMER DEVICE

CROSS-REFERENCE TO RELATED APPLICATION

The present application claims priority to, and the benefit of, U.S. Provisional Application No. 63/613,326, which was filed on Dec. 21, 2023, and is incorporated herein by reference in its entirety.

FIELD OF THE INVENTION

The present invention relates generally to the field of tools. More specifically, the present invention relates to an adjustable hole framer device that operates as a stabilization and support frame for a cutting tool while said tool makes or enlarges an opening in a surface. Accordingly, the present disclosure makes specific reference thereto. Nonetheless, it is to be appreciated that aspects of the present invention are also equally applicable to other like applications, devices, and methods of manufacture.

BACKGROUND

Expanding or moving an existing hole in various surfaces, such as walls, ceilings, or floors, is a common need for many individuals, particularly those engaged in construction, renovation, or home improvement projects. However, this task presents a unique set of challenges and potential hazards. The process of enlarging or repositioning a hole is complicated by the nature of the tools typically used for such jobs. Most boring tools are designed with a center drill bit intended to guide the tool and ensure precision during the initial drilling. Once a hole has been drilled, this center bit no longer has the original material to anchor into, making it difficult to maintain stability if one attempts to enlarge the hole or create a new center nearby.

This lack of stability can significantly increase the difficulty of the task, as the tool may slip or wander, leading to inaccurate drilling, damage to the surrounding surface, or even injury to the operator. The challenge is compounded when working with hard or brittle materials, where precision is critical, and the margin for error is minimal. In such cases, the risk of cracking or chipping the material adds an additional layer of difficulty.

Moreover, the absence of a solid anchor point for the drill bit means there is nothing to prevent the tool from moving off course. This can result in uneven enlargement of the hole or the creation of a new hole that is not properly aligned with the intended design or structural requirements. Such errors can compromise the integrity of the project, necessitating costly repairs or adjustments.

Therefore, there exists a long-felt need in the art for an improved tool for making or enlarging holes. There also exists a long-felt need in the art for an adjustable hole framer device. More specifically there exists a long-felt need in the art for an adjustable hole framer device that allows a user to enlarge or relocate an existing hole in a stable and precise manner.

The subject matter disclosed and claimed herein, in one embodiment thereof, comprises an adjustable hole frame device. The device is comprised of a combination of vertical and horizontal frame members, each containing rollers capable of 360-degree rotation within tracks or slots of the members and can be fixed in position using fasteners such as set screws. Additionally, the frames include measurement lines for precise positioning and openings for securing the device to a surface with fasteners like screws, nails, or bolts. During use, the horizontal and vertical members can be secured and wherein the rollers of each member can be positioned to stabilize the bit/working end of a cutting tool such that the tool is supported while cutting, drilling, and/or enlarging a hole in a surface.

In this manner, the adjustable hole frame device of the present invention accomplishes all the forgoing objectives and provides an improved tool for making or enlarging holes. More specifically, the device allows a user to enlarge or relocate an existing hole in a stable and precise manner.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an adjustable hole frame device. The device is comprised of at least one (but preferably two) vertical frame member(s) comprised of at least one roller, wherein the vertical frame member(s) attach to at least one (but preferably two) horizontal frame member(s), wherein the horizontal frame member(s) is comprised of at least one roller.

The horizontal frame member is comprised of at least one track that preferably runs the length of the member. The track receives at least one roller that is captured in the track. The roller can rotate 360 degrees parallel with the track. The position of the roller within the track can be secured by tightening at least one fastener. To aid a user in positioning the roller at specific locations, the member may be comprised of at least one measurement line. In order to secure the member to a surface during use, the member may be comprised of at least one opening that can receive a fastener such as but not limited to a screw, a nail, a bolt, etc.

The vertical frame member is comprised of at least one slot that preferably runs the length of the member. The slot receives at least one roller that is captured in the track. The roller can rotate 360 degrees parallel with the track. To aid a user in positioning the roller at specific locations, the member may be comprised of at least one measurement line. In order to secure the member to a surface during use, the member may be comprised of at least one opening that can receive a fastener such as but not limited to a screw, a nail, a bolt, etc. The horizontal member can be repositionable and secured to the vertical frame member by placing at least one connection fastener through the slot and into the track and/or against the member.

The present invention is also comprised of a method of using the device. First, a device is provided comprised of a first vertical frame member comprised of a track, a roller, and a fastener, and a second vertical frame member comprised of a track, a roller, and a fastener, a first horizontal frame member comprised of a slot, a roller, and a fastener, and a second horizontal frame member comprised of a slot, a roller, and a fastener. Then, a user can determine the position of the closest stud and fasten a first frame member of the device in the position needed. Then, a user can position a second frame member that is opposite (i.e., across) from the first frame member in the location needed for hole adjustment. Next, a user can position the remaining frame members in the location needed to move or enlarge an existing hole in the surface the device rests on. Next, the user can tighten all fasteners of the device. Then, a user can place a hole saw drill (or other similar tool) into the existing hole such that all four rollers are touching the drill. A user can then begin expanding the existing hole (or drill/cut a new hole) while the drill is supported by the rollers.

Accordingly, the adjustable hole frame device of the present invention is particularly advantageous as it provides an improved tool for making or enlarging holes. More specifically, the device allows a user to enlarge or relocate an existing hole in a stable and precise manner. In this manner, the adjustable hole frame device overcomes the limitations of existing hole-making and hole-relocating devices known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
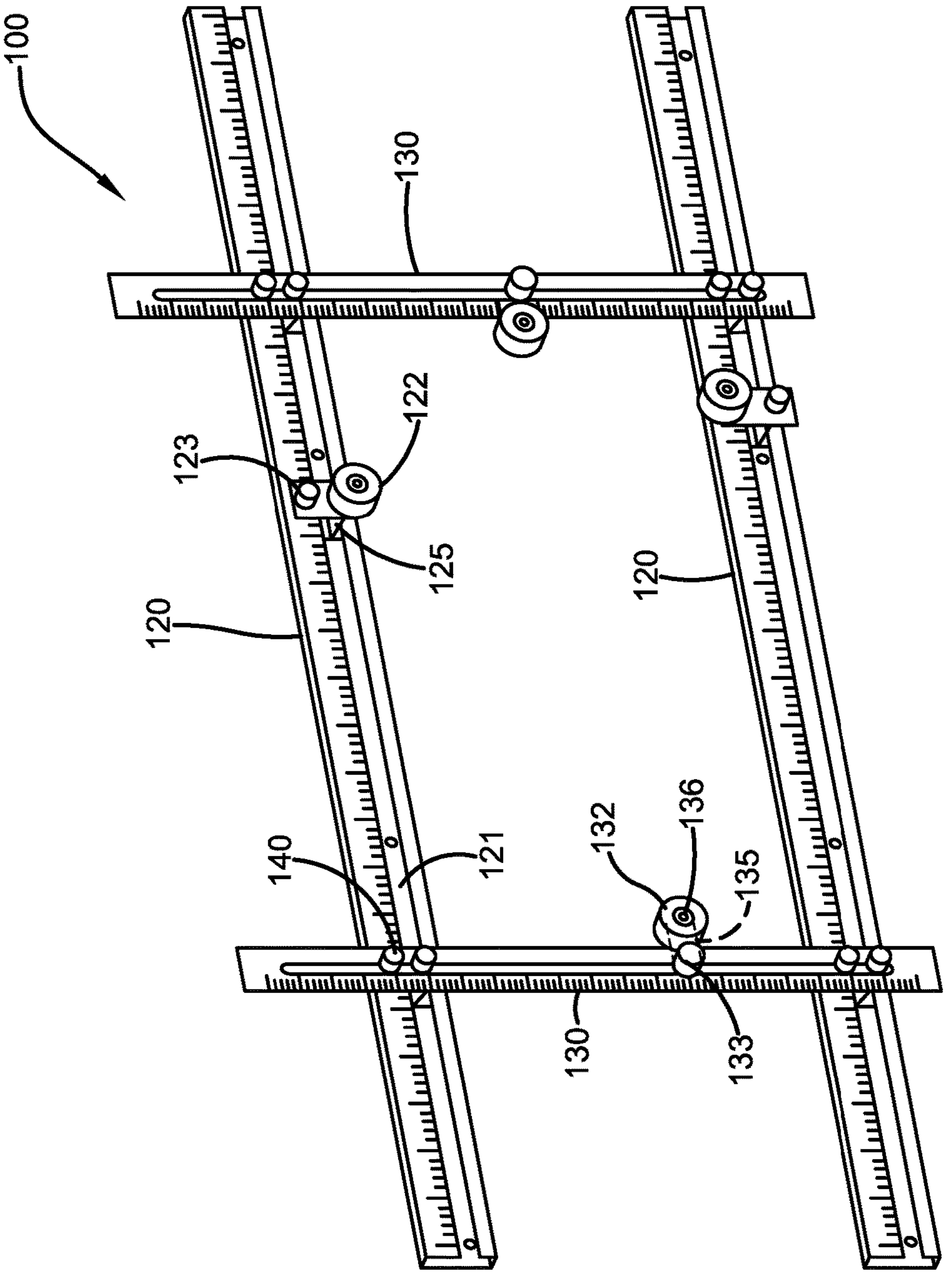
FIG. 1 illustrates a perspective view of one potential embodiment of an adjustable hole frame device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved tool for making or enlarging holes. There also exists a long-felt need in the art for an adjustable hole framer device. More specifically there exists a long-felt need in the art for an adjustable hole framer device that allows a user to enlarge or relocate an existing hole in a stable and precise manner.

The present invention, in one exemplary embodiment, is comprised of an adjustable hole frame device comprised of at least one (but preferably two) vertical frame member(s) comprised of at least one roller, wherein the vertical frame member(s) attach to at least one (but preferably two) horizontal frame member(s), wherein the horizontal frame member(s) is comprised of at least one roller.

The horizontal frame member is comprised of at least one track that preferably runs the length of the member. The track receives at least one roller that is captured in the track. The roller can rotate 360 degrees parallel with the track, wherein the position of the roller within the track can be secured by tightening at least one fastener. To aid a user in positioning the roller at specific locations, the member may be comprised of at least one measurement line. In order to secure the member to a surface during use, the member may be comprised of at least one opening that can receive a fastener such as but not limited to a screw, a nail, a bolt, etc.

The vertical frame member is comprised of at least one slot that preferably runs the length of the member. The slot receives at least one roller that is captured in the track. The roller can rotate 360 degrees parallel with the track. To aid a user in positioning the roller at specific locations, the member may be comprised of at least one measurement line. In order to secure the member to a surface during use, the member may be comprised of at least one opening that can receive a fastener such as but not limited to a screw, a nail, a bolt, etc. The horizontal member can be repositionable and secured to the vertical frame member by placing at least one connection fastener through the slot and into the track and/or against the member.

The present invention is also comprised of a method of using the device. First, a device is provided comprised of a first vertical frame member comprised of a track, a roller, and a fastener, and a second vertical frame member comprised of a track, a roller, and a fastener, a first horizontal frame member comprised of a slot, a roller, and a fastener, and a second horizontal frame member comprised of a slot, a roller, and a fastener. Then, a user can determine the position of the closest stud and fasten a first frame member of the device in the position needed. Then, a user can position a second frame member that is opposite (i.e., across) from the first frame member in the location needed for hole adjustment. Next, a user can position the remaining frame members in the location needed to move or enlarge an existing hole in the surface the device rests on. Next, the user can tighten all fasteners of the device. Then, a user can place a hole saw drill (or other similar tool) into the existing hole such that all four rollers are touching the drill. A user can then begin expanding the existing hole (or drill/cut a new hole) while the drill is supported by the rollers.

Accordingly, the adjustable hole frame device of the present invention is particularly advantageous as it provides an improved tool for making or enlarging holes. More specifically, the device allows a user to enlarge or relocate an existing hole in a stable and precise manner. In this manner, the adjustable hole frame device overcomes the limitations of existing hole-making and hole-relocating devices known in the art.

Referring initially to the drawings, FIG. 1 illustrates a perspective view of one potential embodiment of an adjustable hole frame device 100 of the present invention in accordance with the disclosed architecture. The device 100 is comprised of at least one (but preferably two) vertical frame member(s) 120 comprised of at least one roller 122, wherein the vertical frame member(s) 120 attach to at least one (but preferably two) horizontal frame member(s) 130, wherein the horizontal frame member(s) 130 is comprised of at least one roller 132.

Figure 2:
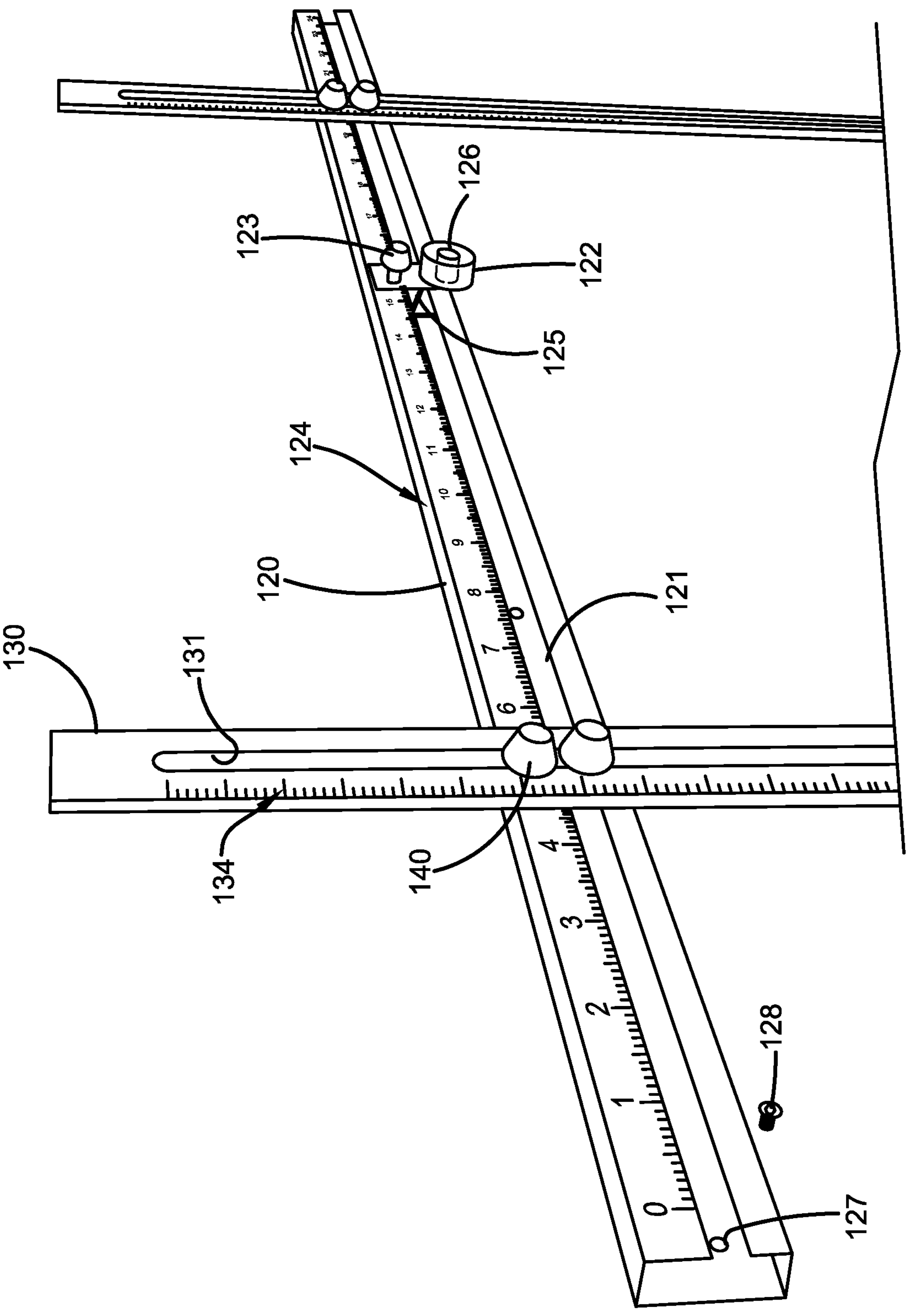
FIG. 2 illustrates an enhanced perspective view of one potential embodiment of an adjustable hole frame device of the present invention in accordance with the disclosed architecture.

The horizontal frame member 120 may be made from any material known in the art such as but not limited to metal, plastic, wood, etc. The member 120 may be any shape but is preferably rectangular. The member 120 is comprised of at least one track 121 that preferably runs the length of the member 120. The track 121 receives at least one roller 122 that is captured in the track 121. The roller 122 can rotate 360 degrees parallel with the track 121. The position of the roller 122 within the track 121 can be secured by tightening at least one fastener 123, such as but not limited to a set screw, onto the track 121 and/or member 120. The fastener 123 and roller 122 are preferably attached via at least one bracket 125 (as seen in FIG. 2), wherein the bracket 125 is comprised of at least one axle 126 around which the roller 122 spins. To aid a user in positioning the roller 122 at specific locations, the member 120 may be comprised of at least one measurement line 124. The line 124 may be in any unit such as but not limited to inches, centimeters, millimeters, etc. In order to secure the member 120 to a surface during use, the member 120 may be comprised of at least one opening 127 that can receive a fastener 128 such as but not limited to a screw, a nail, a bolt, etc.

The vertical frame member 130 may be made from any material known in the art such as but not limited to metal, plastic, wood, etc. The member 130 may be any shape but is preferably rectangular. The member 130 is comprised of at least one slot 131 that preferably runs the length of the member 130. The slot 131 receives at least one roller 132 that is captured in the track 131. The roller 132 can rotate 360 degrees parallel with the track 131. The position of the roller 132 within the slot 131 can be secured by tightening at least one fastener 133, such as but not limited to a set screw, onto the track 131 and/or member 130. The fastener 133 and roller 132 are preferably attached via at least one bracket 135, wherein the bracket 135 is comprised of at least one axle 136 around which the roller 132 spins. To aid a user in positioning the roller 132 at specific locations, the member 130 may be comprised of at least one measurement line 134. The line 134 may be in any unit such as but not limited to inches, centimeters, millimeters, etc. In order to secure the member 130 to a surface during use, the member 130 may be comprised of at least one opening 137 that can receive a fastener 138 such as but not limited to a screw, a nail, a bolt, etc. The horizontal member 130 can be repositionable and secured to the vertical frame member 120 by placing at least one connection fastener 140 through the slot 131 and into the track 121 and/or against the member 120. The fastener 140 is preferably a threaded fastener, a set screw, etc., but may be any type.

Figure 3:
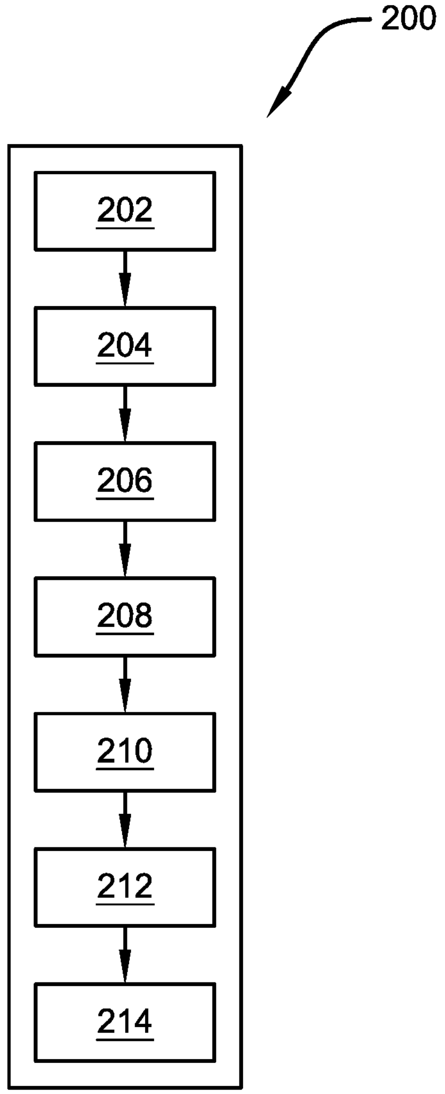
FIG. 3 illustrates a flowchart of a method of using one potential embodiment of an adjustable hole frame device of the present invention in accordance with the disclosed architecture.

The present invention is also comprised of a method of using 200 the device 100, as seen in FIG. 3. First, a device 100 is provided comprised of a first vertical frame member 120 comprised of a track 121, a roller 122 and a fastener 123, and a second vertical frame member 120 comprised of a track 121, a roller 122 and a fastener 123, a first horizontal frame member 130 comprised of a slot 131, a roller 132, and a fastener 133, and a second horizontal frame member 130 comprised of a slot 131, a roller 132, and a fastener 133 [Step 202]. Then, a user can determine the position of the closest stud and fasten a first frame member 120,130 of device 100 in the position needed [Step 204]. Then, a user can position a second frame member 120,130 that is opposite (i.e., across) from the first frame member 120,130 in the location needed for hole adjustment [Step 206]. Next, a user can position the remaining frame members 120,130 in the location needed to move or enlarge an existing hole in the surface the device 100 rests on [Step 208]. Next, the user can tighten all fasteners 123,133,140 of the device 100 to secure the frame members 120,130 into a generally square or rectangular position [Step 210]. Then, a user can place a hole saw drill (or other similar tool) into the existing hole such that all four rollers 122,132 are touching the drill [Step 212]. A user can then begin expanding the existing hole (or drill/cut a new hole) using the drill/tool while the drill is supported by the rollers 122,132 [Step 214].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "adjustable hole frame device" and "device" are interchangeable and refer to the adjustable hole frame device 100 of the present invention.

Notwithstanding the forgoing, the adjustable hole frame device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the adjustable hole frame device 100 as shown in the FIGS. are for illustrative purposes only, and that many other sizes and shapes of the adjustable hole frame device 100 are well within the scope of the present disclosure. Although the dimensions of the adjustable hole frame device 100 are important design parameters for user convenience, the adjustable hole frame device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An adjustable hole frame device comprising:

a connection fastener;

a horizontal frame member comprised of a first track, a first roller, a first fastener, first measuring line, and a first opening; and a vertical frame member comprised of a first slot, a second roller, a second measuring line, and a second fastener.

2. The adjustable hole frame device of claim 1, wherein the first fastener is comprised of a set screw.

3. The adjustable hole frame device of claim 1, wherein the second fastener is comprised of a set screw.

4. The adjustable hole frame device of claim 1, wherein the first roller attaches to a bracket.

5. The adjustable hole frame device of claim 4, wherein the bracket is comprised of an axle that the roller rotates 360 degrees around.

6. The adjustable hole frame device of claim 1, wherein the first track runs a length of the horizontal frame member.

7. The adjustable hole frame device of claim 1, wherein the first roller is captured in the first track.

8. The adjustable hole frame device of claim 1, wherein the second roller is captured in the first slot.

9. A method of using an adjustable hole frame device, the method comprising the following steps:

providing an adjustable hole frame device comprised of a first vertical frame member comprised of a first track, a first roller, and a first fastener, a second vertical frame member comprised of a second track, a second roller, and a second fastener, a first horizontal frame member comprised of a first slot, a third roller, and a third fastener, and a second horizontal frame member comprised of a second slot, a fourth roller, and a fourth fastener;

determining the position of a stud and fastening the first vertical frame member in position;

positioning the second vertical frame member across from the first vertical frame member;

positioning the first horizontal frame member and the second horizontal frame member in the location needed to move or enlarge a hole in a surface the adjustable hole frame device rests on;

tightening the first fastener, the second fastener, the third fastener, and the fourth fastener to secure the first vertical frame member, the second vertical frame member, the first horizontal frame member, and the second horizontal frame member together;

placing a tool into the existing hole such that the first roller, the second roller, the third roller, and the fourth roller are touching the tool; and expanding the hole using the A user can then begin expanding the existing hole (or drill/cut a new hole) while the tool is supported by the first roller, the second roller, the third roller, and the fourth roller.

10. The method of using an adjustable hole frame device of claim 9, wherein the first vertical member attaches to the first horizontal member and the second horizontal member.

11. The method of using an adjustable hole frame device of claim 9, wherein the second vertical member attaches to the first horizontal member and the second horizontal member.

12. The method of using an adjustable hole frame device of claim 9, wherein the adjustable hole frame device is comprised of a measurement line.

* * * * *